J. C. SPARKS.
AUTOMOBILE.
APPLICATION FILED NOV. 18, 1912.
1,058,341.
Patented Apr. 8, 1913.
3 SHEETS—SHEET 1.
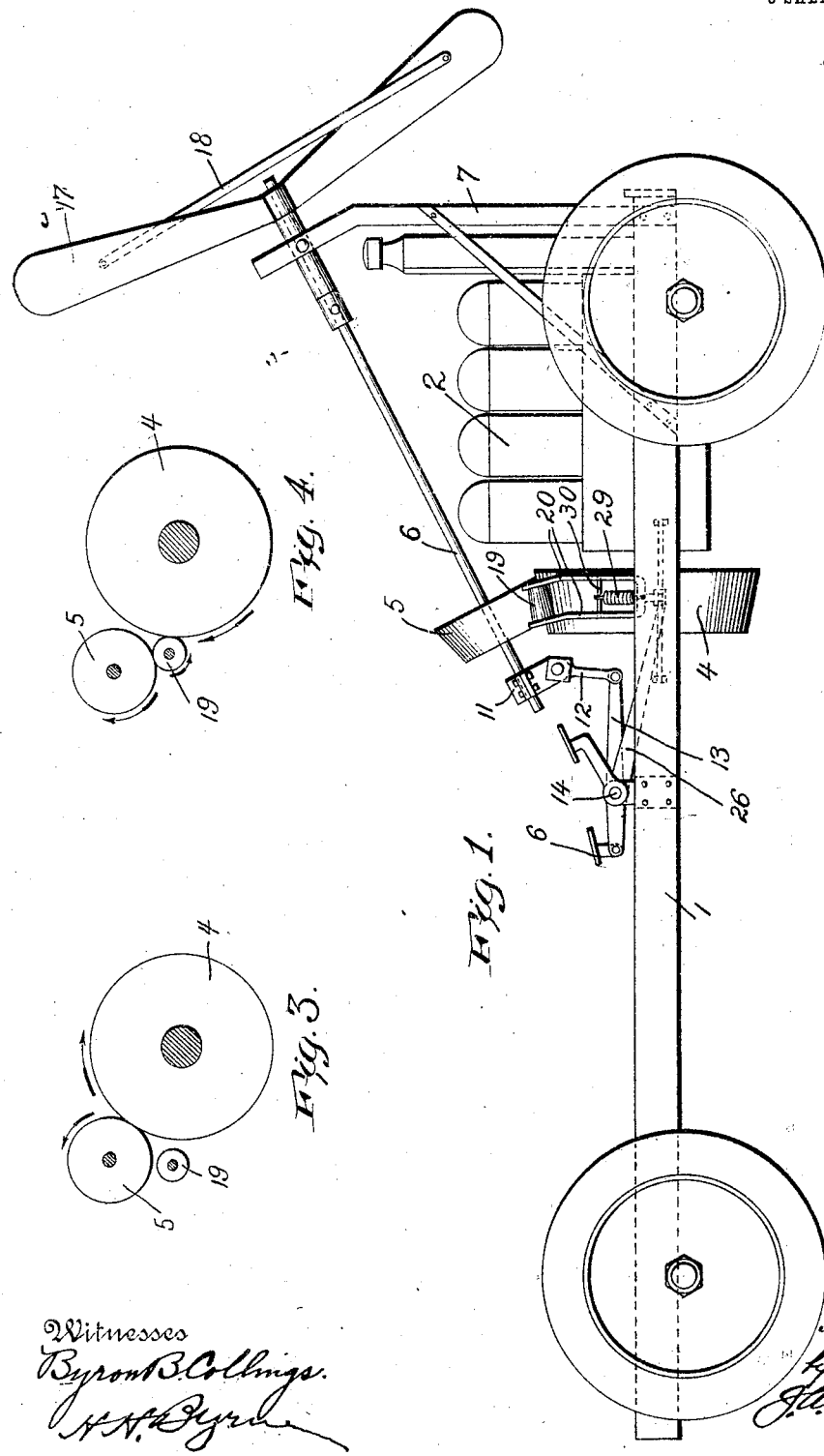

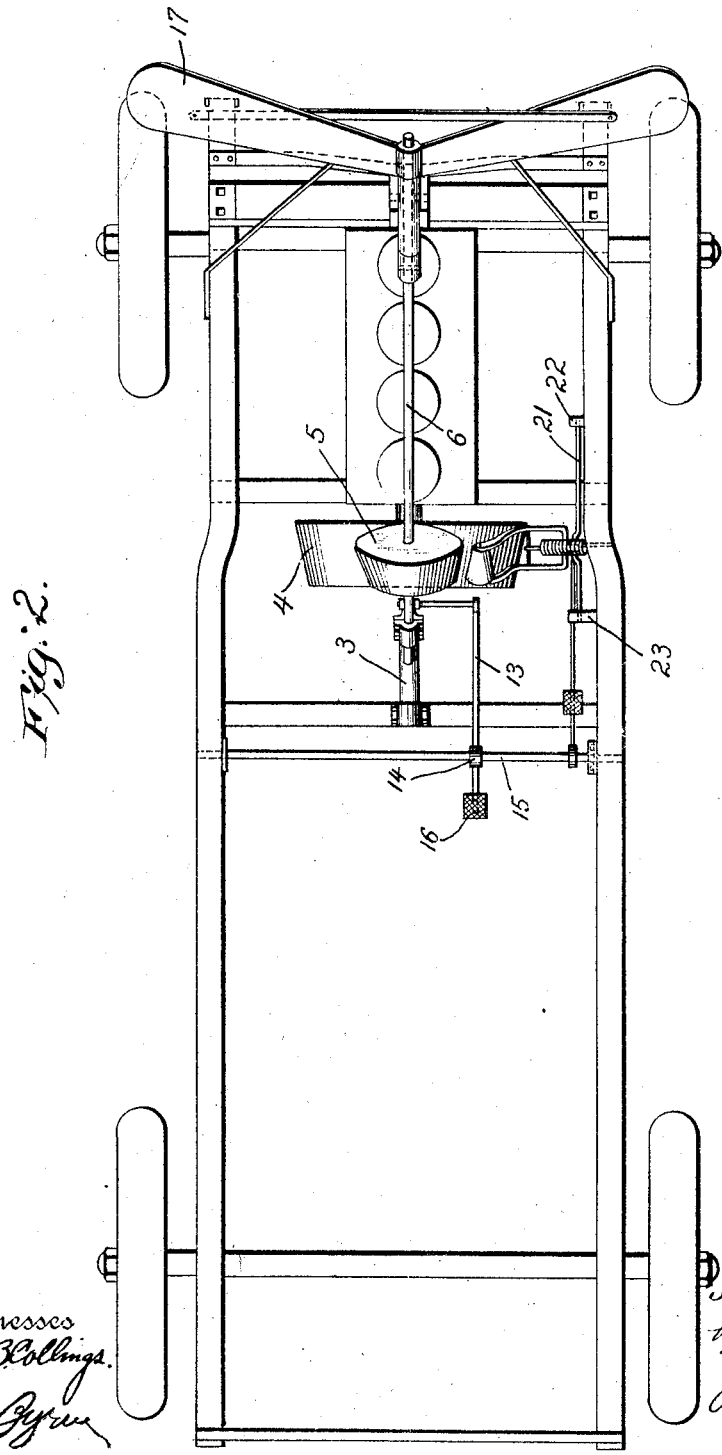

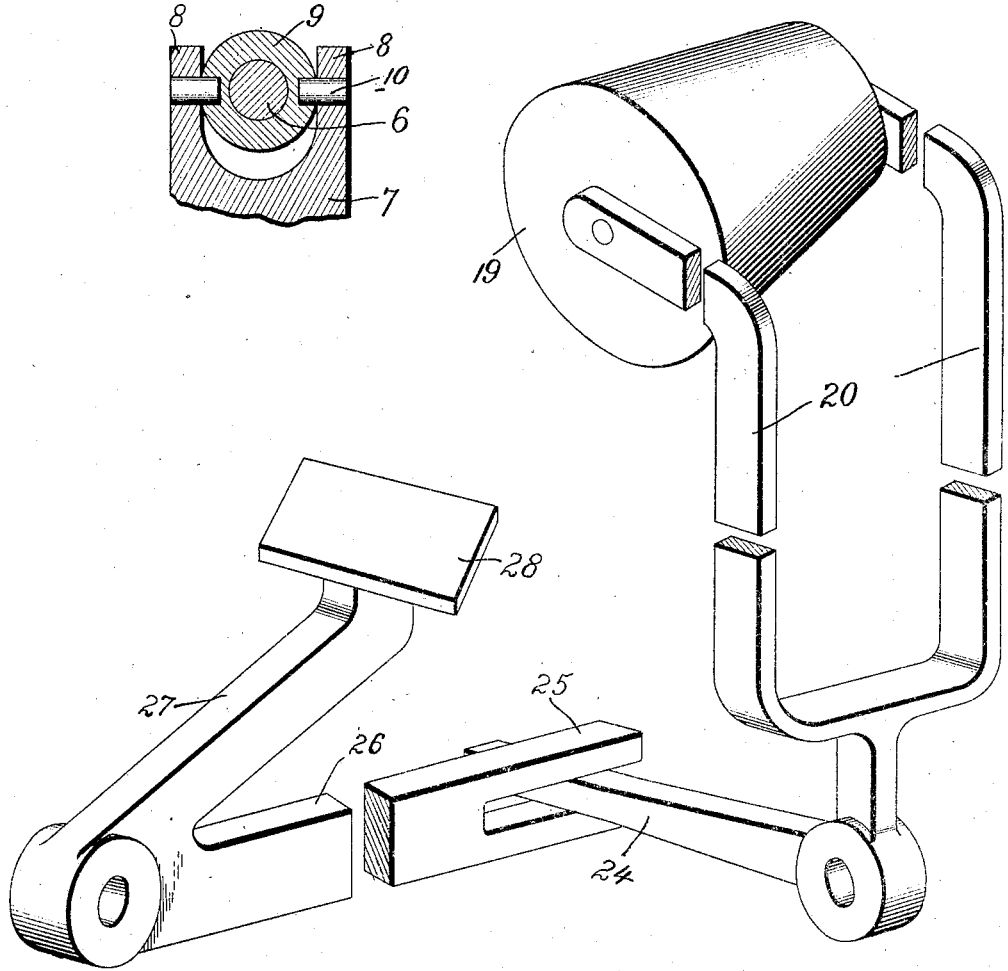

UNITED STATES PATENT OFFICE.

JASON C. SPARKS, OF CONCORD, NEBRASKA.

AUTOMOBILE.

1,058,341. Specification of Letters Patent. Patented Apr. 8, 1913.

Application filed November 18, 1912. Serial No. 732,096.

*To all whom it may concern:*

Be it known that I, JASON C. SPARKS, a citizen of the United States of America, residing at Concord, in the county of Dixon and State of Nebraska, have invented certain new and useful Improvements in Automobiles, of which the following is a specification.

The present invention relates to automobiles and has for its purpose to provide an arrangement for propelling the cars of that character without the employment of the usual wheel driving mechanism and whereby all of the present unfavorable conditions attending automobile propulsion are avoided.

The invention has for its further purpose to provide a construction which will be inexpensive to install, one which will be thoroughly reliable when in use; and which will present an attractive appearance and one which will suggest itself as an appropriate device to the public generally.

With these and other objects in view the invention consists in the arrangement and combination of parts hereinafter claimed, and while the invention is not restricted to the exact details shown and described, still, for the purpose of disclosure, reference is had to the accompanying drawings, in which like characters designate the same parts in the several views, and in which, Figure 1 is a side elevational view of an automobile equipped with the present invention; Fig. 2 is a top plan view of the same; Fig. 3 is a front elevational view of the friction drive used in forward running; Fig. 4 is a similar view showing the means for effecting reverse running; Fig. 5 is an enlarged detailed perspective view of the reverse controlling device; Fig. 6 is a transverse sectional view of the propeller shaft bearing support; and, Fig. 7 is a longitudinal sectional view of said support showing the propeller shaft in elevation.

Referring to the construction in detail 1 designates a vehicle, which is herein shown as an automobile having the usual motor 2, mounted therein in any suitable manner. The motor shaft 3 has a fly wheel 4 of truncated conical design whereby to provide a friction-driving member. Said flywheel has frictional engagement with a similar but smaller friction wheel 5 mounted on shaft 6, said shaft 6 is mounted at its forward end on an arm 7 that is supported at the front of the vehicles. The upper end of the support 7 is cut away (see Fig. 6) to provide a pair of members 8 between which a sleeve 9 is journaled on a pair of pins 10. The inner end of the shaft 6 is journaled in a bearing block 11 that is mounted on an arm 12 carried by a lever 13. The lever 13 is fulcrumed at 14 on a bar 15 that is disposed transversely of and mounted on the frame of the vehicle. Said lever is provided with a treadle 16 whereby the friction wheel 5 may be moved out of engagement with the friction driving wheel 4 as will be understood. The shaft 6 is disposed on and inclined to the horizontal, and carries on its outer end a propeller 17 whose blades are disposed at that pitch most suited for producing pressure against the air. A bracing bar 18 is provided for reinforcing the propeller blades.

In the arrangement of friction drive shown in Fig. 3 the propeller 17 is driven to produce the forward running of the vehicle, and to produce the reverse thereof there is provided a foot operated device comprising a relatively small friction wheel 19 adapted to be thrown into engagement with both of the friction wheels 4 and 5 as in that manner shown in Fig. 4. Said friction wheel 19 is mounted between the arms 20 of a bracket that is fulcrumed on a shaft 21 that is in turn mounted on suitable members 22 and 23 carried by the vehicle frame. An arm 24 is formed integral with said bracket and its free end engaged by a bifurcated portion 25 of a lever 26 that is fulcrumed on a shaft 15 (see Figs. 1 and 2). A treadle lever 27 having a treadle 28 is formed integral with the lever 26 and through the movement of said treadle lever 27 the bracket carrying the friction roller 19 is caused to be thrown into engaging position. When engaging for reverse drive the friction pulley 5 is held in position through its own weight together with the weight of its shaft 6, and the bearing block 11. A spring 29 is provided for moving the friction roller 19 out of contact with the friction wheels 4 and 5. Said spring has its respective ends secured to the vehicle frame and to a cross-bar 30 connecting the bracket arms 20. With this type of propelling means for an automobile or other vehicle a partial vacuum will be created in front of the car which will act to cause the vehicle to move; there is the further feature that no wind will be thrown against the occupants in the vehicle, and the car will run quietly and easily.

It is obvious that those skilled in the art may vary the details of construction and arrangement of parts without departing from the spirit of my invention, and therefore I do not wish to be limited to such features. except as may be required by the claim.

Having thus described my invention, what I claim as new and desire to protect by U. S. Letters Patent is:

The combination with a vehicle of an upwardly disposed arm at the fore end thereof; a sleeve fulcrumed on said arm; a propeller shaft journaled in said sleeve and disposed downwardly toward the rear of the vehicle; an air propeller on said shaft; a movable journal bearing for the lower end of said shaft; a motor carried by the vehicle; a friction wheel mounted on said propeller shaft and adapted to have frictional engagement with the motor driven friction wheel; a relatively smaller friction wheel adapted to be engaged with the aforesaid friction wheels to effect reverse driving of said shaft; and means for moving said last named friction wheel into and out of frictional engagement, substantially as described.

In testimony whereof I affix my signature in presence of two witnesses.

JASON C. SPARKS.

Witnesses:
 A. BRENNAN,
 D. VAN DONSELARD.